(12) United States Patent
Mortreux et al.

(10) Patent No.: US 8,106,137 B2
(45) Date of Patent: Jan. 31, 2012

(54) CATALYTIC ALUMINUM-FREE COMBINATION FOR POLYMERIZING ALPHA-OLEFINS AND POLYMERIZATION METHOD USING SAME

(75) Inventors: André Mortreux, Hem (FR); Régis Gauvin, Lille (FR); Estelle Gautier, Lormont (FR)

(73) Assignee: Universite des Sciences et Technologies, Villeneuve d'Ascq (FR)

( * ) Notice: Subject to any disclaimer, the term of this patent is extended or adjusted under 35 U.S.C. 154(b) by 428 days.

(21) Appl. No.: 11/922,403

(22) PCT Filed: Jun. 21, 2006

(86) PCT No.: PCT/FR2006/001409
§ 371 (c)(1),
(2), (4) Date: Feb. 8, 2008

(87) PCT Pub. No.: WO2006/136707
PCT Pub. Date: Dec. 28, 2006

(65) Prior Publication Data
US 2008/0269438 A1    Oct. 30, 2008

(30) Foreign Application Priority Data
Jun. 21, 2005    (FR) .................................... 05 06282

(51) Int. Cl.
*C08F 4/52* (2006.01)
*C08F 4/50* (2006.01)
*C08F 4/64* (2006.01)
*C08F 4/76* (2006.01)

(52) U.S. Cl. ........ 526/161; 526/151; 526/148; 526/172; 526/165; 502/115; 502/114

(58) Field of Classification Search ................. 502/202, 502/115, 114, 113, 104, 133, 152, 153, 154; 526/172, 161, 134, 151, 148, 165
See application file for complete search history.

(56) References Cited

U.S. PATENT DOCUMENTS 4,990,585 A * 2/1991 Kawata et al. ............. 526/348.5
6,121,394 A * 9/2000 Sugimoto et al. .......... 526/124.3
6,291,386 B1 * 9/2001 Wang ............................ 502/124

OTHER PUBLICATIONS

Scollard et al., Macromolecules 1996, 29, 5241-5243.*
Scollard et al., J. Molecular Catal. A: Chemical, 1998, 128, 201-214.*
Scollard et al., J. Am. Chem. Soc. 1996, 118, 10008-10009.*
Tsubaki et al., Macromol. Chem. Phys., 2001, 202, 482-487.*
Tsubaki S., et al.: Synthesis of Isotactic Poly(Propylene) by Titanium Based Catalysts Containing Diamide Ligands, Macromolecular Chemistry and Physics, Wiley-VCH Verlag, Weinheim, DE, vol. 202, No. 4, Feb. 28, 2001, pp. 482-487, XP001025436 ISSN: 1022-1352.
Scollard, J.D., et al.: Chelating Diamide Complexes of Titanium: New Catalyst Precursors for the Highly Active and Living Polymerization of Alpha-Olefins, Journal of Molecular Catalysis. A, Chemical, Elsevier, Amsterdam, NL, vol. 128, Feb. 1998, pp. 201-214, XP000827526, ISSN: 1381-1169.

* cited by examiner

*Primary Examiner* — Rip A. Lee
(74) *Attorney, Agent, or Firm* — Kenyon & Kenyon LLP

(57) ABSTRACT

The invention concerns a novel catalytic combination for polymerizing alpha-olefins based on a titanium diamidide complex. The invention also concerns a method for polymerizing alpha-olefins using said catalytic combination, in the absence of any aluminum-containing compound. The inventive catalytic combination comprises: component A which is a dichlorinated titanium diamidide complex of general formula (I) wherein R represents a methyl group (component A2) or an isopropyl group (component A1); component B which is a dialkylmagnesium whereof the reaction with component A enables an alkylated component AA to be obtained: and as activator of said component AA, component C which is trispentafluorophenylboran ($B(C_6F_5)_3$).

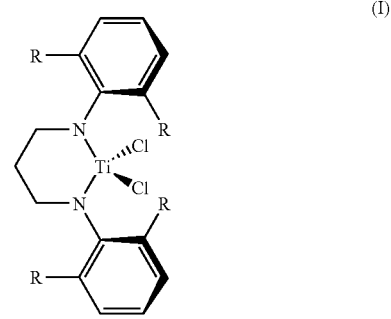

(I)

12 Claims, 3 Drawing Sheets

CATALYTIC ALUMINUM-FREE COMBINATION FOR POLYMERIZING ALPHA-OLEFINS AND POLYMERIZATION METHOD USING SAME

This is a 371 national phase application of PCT/FR2006/001409 filed 21 Jun. 2006, claiming priority to French Patent Application No. FR 0506282 filed 21 Jun. 2005, the contents of which are incorporated herein by reference.

FIELD OF THE INVENTION

The present invention generally concerns the polymerization of alpha-olefins. More specifically, it relates to a novel catalytic combination to polymerize alpha-olefins, based on a titanium diamide complex. The invention also concerns a method to polymerize alpha-olefins using said catalytic combination, in the absence of any aluminum-containing compound.

BACKGROUND OF THE INVENTION

The polymerization of alpha-olefins allows hydrocarbons to be obtained which are widely used as base for up-market engine lubricants, owing to their higher performance levels compared with mineral and semi-synthetic oils: higher viscosity index, better heat resistance, better oxidation resistance.

Numerous methods for synthesizing polyolefins have been described in the literature, using a varied range of catalysts, amongst which titanium-, vanadium-, zirconium-based catalysts associated with organic aluminum components.

Document EP 0 569 388 describes a formulation of catalysts intended to be used in a method to produce polyalpha-olefins of high molecular weight. Said catalyst formulation comprises a compound derived from a transition metal (Zr, Hf, Ti) and an aluminoxane. The method to produce a polyalpha-olefin described in this document consists of contacting one or more alpha-olefin monomers with a catalytically active association comprising said compound or said catalyst formulation, and collecting the poly alpha-olefin thus formed.

In the particular case of catalytic systems containing dimethyl diamide of titanium, interesting results reported in the publication by Scollard J. D. et al published in *Macromolecules* 1996, 22, 5241-5243 were obtained when polymerization of 1-hexene was conducted in the presence of a large excess of aluminoxane (tests n°1 and 2 in table 1 of said publication).

The use of aluminum activators in substantial quantity for the synthesis of polyalpha-olefins has numerous disadvantages however, leading in particular to pollution of the polymerization reactor, and brings constraints such as the subsequent removal of aluminum residues obtained after hydrolysis.

Also, the association of the dimethyl diamide complex of titanium with an activator of Lewis acid type such as tris-pentafluorophenylborane [$B(C_6F_5)_3$] in the presence of a high quantity (500 equivalents) of methylaluminoxane (MAO) described in the document by Scollard et al gives unsatisfactory results in terms of molecular weight and activity (tests no. 5 and 6 in table 1 of said publication).

Complementary results published by the same authors in *J. Am. Chem. Soc.* 1996, 118, 10008-10009, describe the polymerization of alpha-olefins at room temperature in the presence of a dimethyl diamide complex of titanium and tris-pentafluorophenylborane as activator. However, the data given in table 1 of this document show that the molecular weight and the production activity of the poly alpha-olefins obtained remain limited.

The use of the dimethyl diamide complex however entails the prior synthesis of this compound which incidentally is highly sensitive. Additionally, the use of MAO in large excess makes the catalytic system more costly, and involves the subsequent elimination of aluminum residues obtained after hydrolysis.

Also, it appears that during polymerization reactions of alpha-olefins involving use of the dimethyl diamide complex of titanium, the results obtained are scarcely reproducible on account of the low stability of said complex.

SUMMARY OF THE INVENTION

The present invention sets out to overcome these drawbacks of known catalytic systems used for the polymerization of alpha-olefins.

One first object of the invention is to propose a good-performance catalytic combination able to generate the active species in situ during polymerization of alpha-olefins, thereby providing better control over the polymerization reaction and allowing polyalpha-olefins of high molecular weight to be obtained under optimized conditions in terms of time, temperature and quantity of catalysts.

A further object of this invention is to show the possible in situ alkylation of a dichlorinated precursor complex, without having recourse to the presence of organic aluminum in the reaction medium, which per se forms an original, novel aspect in the field of alpha-olefin polymerization on catalysts containing group 4 metals.

For this purpose and according to a first aspect, the invention concerns a catalytic combination for the polymerization or copolymerization of alpha-olefins, which contains the following components A, B and C:

component A which is a dichlorinated complex of titanium diamide of general formula I:

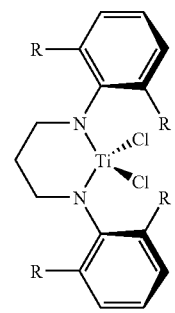

I in which R is a methyl group (component A2) or an isopropyl group (component A1);

component B which is a dialkylmagnesium whose reaction with component A allows an alkylated component AA to be obtained of general formula II:

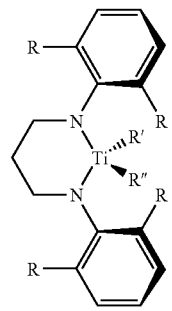

II and, as activator of said alkylated component AA, component C which is tris-pentafluorophenylborane ($B(C_6F_5)_3$).

The association of these three components A, B and C forms a good-performance catalysis system for the polymerization of alpha-olefins, of 1-hexene in particular, which bypasses the direct use of the active dimethyl diamide complex of titanium which is characterized by great sensitivity to water and oxygen.

The catalytic combination of the invention has the particularity of allowing the in situ generation of the active catalyst during polymerization or co-polymerization of alpha-olefins, using stable components that are commercially available or easily accessible and which are used in catalytic quantities, without having recourse to a large excess of alkylating and/or passivating agent.

According to a second aspect, the invention relates to a method to polymerize or copolymerize alpha-olefins using said catalytic combination, characterized in that it comprises the following steps:

i. alkylating component A in situ, previously suspended in a solvent, using component B to obtain an alkylated component AA of general formula II, in which R is a methyl group (component AA2) or an isopropyl group (component AA1);

ii. activating the alkylated component AA by adding component C to the reaction medium, to form an active catalyst D in situ;

iii. adding to the reaction medium containing the active catalyst D at least one alpha-olefin monomer and optionally at least one comonomer, under conditions (temperature, time, solvent) allowing the synthesis of a polyalpha-olefin polymer or copolymer.

The invention will now be described in detail.

According to a first aspect, the invention relates to a catalytic combination for the polymerization or copolymerization of alpha-olefins, containing the following components A, B and C:

component A which is a dichlorinated complex of titanium diamide of general formula I:

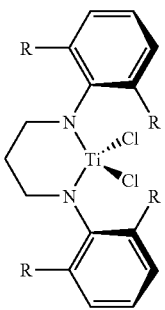

I in which R is a methyl group (component A2) or an isopropyl group (component A1);

component B which is a dialkylmagnesium whose reaction with component A allows an alkylated component AA to be obtained of general formula II:

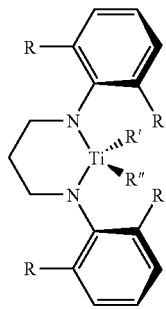

II and, as activator of said alkylated component AA, component C which is tris-pentafluorophenylborane [B($C_6F_5$)$_3$].

The applicant has found that, irrespective of the tests conducted with the dimethyl diamide complex of titanium to polymerize hexene-1 in the presence of tris-pentafluorophenylborane, there arose problems of reproducibility owing to the poor stability of the dimethyl complex. This led to contemplating the in situ formation of a dialkyl complex prior to the polymerization reaction of an alpha-olefin.

The association of a dichlorinated diamide of titanium, a dialkylmagnesium and of tris-pentafluorophenylborane in stoichiometric quantities yields a dialkylated diamide of titanium which is an active catalyst in the polymerization of alpha-olefins, of hexene-1 in particular.

Compared with other known catalytic complexes active in the polymerization of alpha-olefins, such as zirconocene-based complexes in the presence of organic aluminum components, the precursor complex of the invention based on titanium diamide sets itself apart through its simple synthesis and use of low-cost products.

The schematic in FIG. 3 shows the method to synthesize dichlorinated diamide complexes of titanium A1 and A2 described in the literature.

To access the A2 complex, the applicant has developed a direct synthesis method from a diamine ligand, as shown in FIG. 4.

The dropwise addition of the diamine ligand a2 to a solution of $TiCl_4$ in toluene at low temperature allows the formation of the mono-coordinated species with the metal. The addition of excess triethylamine (Lewis base) allows deprotonation of the remaining amine function and formation of the A2 complex. The yield of this reaction is 48%.

Crystals of the dichlorinated diamide complex of titanium were isolated by this method and analyzed by X-ray-analysis. The amide functions are planar due to $sp^2$ hybridization of nitrogen. The aromatic cycles are perpendicular to the plane formed by the two amides and the metal. The methyl-type substituents therefore ensure protection of the metal.

Unlike the dimethyl diamide complex of titanium, the dichlorinated precursor complex (component A) is stable, its association with components B and C allowing a good-performing catalysis system to be obtained for polymerization of alpha-olefins, and leading to reproducible results.

Components B and C are commercially available.

Preferably the dialkylmagnesium entering into the composition of the precursor system of the invention is butylethylmagnesium.

According to a second aspect, the invention pertains to a method for polymerizing or copolymerizing alpha-olefins, using the described catalytic combination, characterized in that it comprises the following steps:

i) in situ alkylation of component A, previously suspended in a solvent, using component B to obtain an alkylated component AA of general formula II, in which R is a methyl group or an isopropyl group;

ii) activation of the alkylated compound AA through the addition of component C to the reaction medium, for the in situ formation of an active catalyst D;

iii) adding to the reaction medium containing the active catalyst D at least one alpha-olefin monomer and optionally at least one comonomer, under conditions (time, temperature, solvent) allowing the synthesis of a polyalpha-olefin polymer or copolymer.

The alpha-olefin monomer is chosen from among the alpha-olefins containing 2 to 30 carbon atoms. In one embodiment, the alpha-olefin monomer is 1-hexene.

When the alpha-olefin monomer is copolymerized in the presence of a comonomer, the latter is chosen to be a different olefin molecule in the same $C_2$ to $C_{30}$ range.

In one embodiment, the solvent in which component A is suspended is the monomer to be (co)polymerized. In this case, this monomer is also used as solvent for step i) to alkylate said component A and for step ii) to activate the alkylated compound AA.

DETAILED DESCRIPTION

Figure 1:
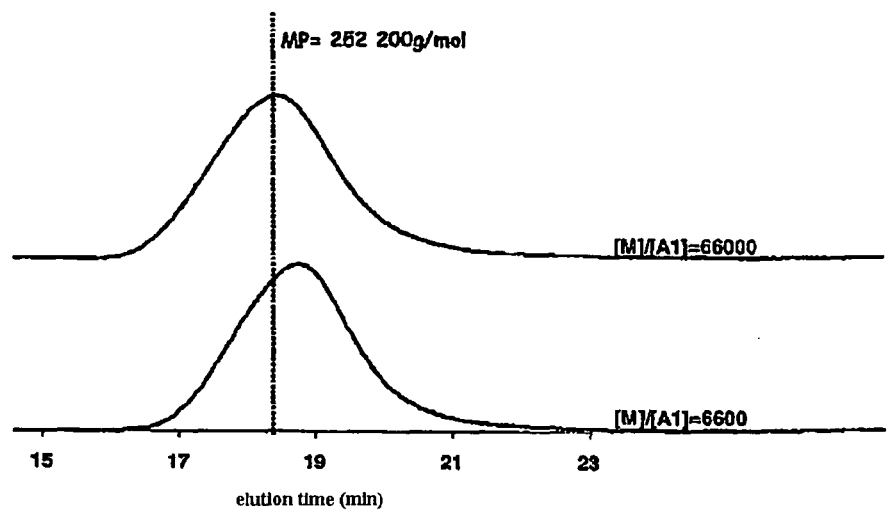
FIG. 1 shows the SEC profiles of the poly(1-hexine)s obtained with two ratios of monomer/catalyst precursor (see Example 4 below)

The invention will be better understood on reading the following examples of embodiment which are non-limiting.

Example 1

Polymerization of 1-Hexene at Room Temperature

In a glove box in an argon atmosphere (H$_2$0 and 0$_2$ content less than 1 ppm) 6.8 mg of component A1 (13.3 μmol) (R being the isopropyl group) are suspended in 1 mL dry, degassed pentane. Under magnetic stirring, the addition is made of 7.9 mg of a 20 wt. % solution of butylethylmagnesium in heptane (14.4 μmol). After a reaction time of one hour at room temperature, 0.1 mL of this solution is transferred to a reactor in which a solution of 0.68 mg B(C$_6$F$_5$)$_3$ is then added (1.33 μmol) in 0.1 mL dry, degassed pentane. Using a syringe, 10 mL of 1-hexene (0.080 mol, 60000 equivalents) are added slowly. After a reaction time of one hour at room temperature, 20 mL of methanol are added to the reactor. A viscous, white solid is precipitated. This is redissolved in dichloromethane then re-precipitated in methanol. 1.118 g of poly (1-hexene) are obtained i.e. a yield of 840 kg$_{pol}$, mol$_{cata}$$^{-1}$.h$^{-1}$. $^1$H and $^{13}$C NMR analyses are characteristic of a regio-regular, atactic poly(1-hexene). SEC gave an Mn value of 7715 g.mol$^{-1}$ and a PI index of 4.62.

Example 2

Polymerization of 1-hexene

In a glove box under an argon atmosphere (H$_2$0 and 0$_2$ content less than 1 ppm) a glass reactor is filled with a solution of 5.3 mg of component A2 (13.3 μmol) (R being the methyl group) in 1 mL dry, degassed toluene. Under magnetic stirring, 9.2 mg of a 20 wt. % solution of butylethylmagnesium in heptane (16.7 μmol) diluted in 2 mL dry, degassed toluene are then added. After a reaction time of one minute at room temperature, are successively added a solution of 6.8 mg B(C$_6$F$_5$)$_3$ (13.3 μmol) in 2 mL dry, degassed toluene, then 10 mL 1-hexene (0.080 mol, 6000 equivalents). The reactor is hermetically sealed and placed under magnetic stirring outside the glove box, in a hot bath at 70° C. After a reaction time of one hour, 20 mL of methanol are added to the reactor. 1.075 g of polymer are collected i.e. a yield of 81 kg$_{pol}$, mol$_{cata-1}$.h$^{-1}$. $^1$H and $^{13}$C NMR analyses indicate the presence of double bonds.

Example 3

Choice of Alkylating Agent

Several alkylating agents were tested for in situ alkylation of component A1: butylethylmagnesium (BEM) and di(n-hexyl)magnesium ((n-Hex)$_2$Mg), trimethyl-aluminum (TMA), triethylaluminum (TEA) and diethylzinc (Et$_2$Zn). Alkylation of component A is conducted in an alkylation solvent chosen from the group: pentane, toluene, bromobenzene, pure alpha-olefin monomer.

Alkylation of the dichlorinated complex A1 is conducted in solution in 1 mL pentane through the addition of 1 equivalent of alkylating agent B. The solution is stirred one hour at room temperature. The solution rapidly assumes a yellow color characteristic of alkyl titanium complexes, except in the case of diethylzinc. The coloring becomes brown after 15 minutes with the two magnesium agents, whereas the solution remains yellow with the alkylaluminums.

After alkylation, one equivalent of component C [B(C$_6$F$_5$)$_3$] is added in solution in 1 mL pentane. An insoluble orange-yellow species is formed with the magnesium agents. With the aluminum derivatives no precipitate is formed, the solution becoming orange-yellow in this case.

Activation of component AA is performed in an activation solvent chosen from the group: pentane, toluene, bromobenzene, pure alpha-olefin monomer.

Polymerization is conducted through the addition of the monomer to the catalytic solution. The results are given in table 1.

The results obtained are able to show that solely component A1 alkylated with BEM is active for polymerization of 1-hexene in the presence of component C [B(C$_6$F$_5$)$_3$]. The catalytic combination of the invention shows an activity between 5 and 10 times higher than those obtained with the dimethyl diamide complex of titanium activated with borane (conforming to J. Am. Chem. Soc. 1996, 118, 10008-10009). Polymerization is highly exothermal (boiling of the reagent within 30 seconds) and less than 5 minutes are required for the system to set. Hydrolysis occurs after 30 minutes.

The other alkylating agents do not allow polymerization of 1-hexene under the conditions used. Di(n-hexyl) magnesium does however show very low activity, which is not comparable with the activity obtained with BEM.

The molecular weights obtained with the system comprising component A1/BEM/B(C$_6$F$_5$)$_3$ are six time higher than with the system: alkylated component AA1/B(C$_6$F$_5$)$_3$/excess MAO. NMR analysis of the proton of the polymers is not able to detect the presence of olefin protons. The polymer obtained is atactic.

TABLE 1

| N° | Catalyst | M (g) | TOF (/h) | Activity (g/mmol/h) | Mn (g/mol) | PI |
|---|---|---|---|---|---|---|
| 1 | Alkylated component A1 (AA1)(ref.) | 0.09-0.17 | 270-510 | 13-26 | 12800-17664 | 1.2 |
| 2 | Component A1/BEM | 0.94 | 1406 | 141 | 67420 | 3.3 |
| 3 | Component A1/ (n-Hex)2Mg | 0.020 | 1.5 | — | — | — |
| 4 | Component A1/Et$_2$Zn | — | — | — | — | — |

TABLE 1-continued

| N° | Catalyst | M (g) | TOF (/h) | Activity (g/mmol/h) | Mn (g/mol) | PI |
|---|---|---|---|---|---|---|
| 5 | Component A1/TMA | — | — | — | — | — |
| 6 | Component A1/TEA | — | — | — | — | — |

[AA1] = [A1] = 13.3 μmol, 1 eq. BEM, 1 eq. B($C_6F_5$)$_3$, 1 mL pentane, 5 mL 1-hexene, T = 27° C., t = 30 min.

Example 4

Influence of Monomer/Catalyst Ratio [M]/[A]

To better control the catalytic reaction, and the results obtained, the quantity of catalyst was substantially reduced. For the first tests the ratio: molar concentration of monomer M/molar concentration of the catalyst precursor (component A1), was approximately 6600. The quick setting and considerable heating of the system do not make it possible to have a precise notion of the activity of this system. The monomer/component A ratio was therefore increased to slow down the reaction and to achieve more favorable conditions for representative measurements of the activity.

Table 2 shows the results obtained for a monomer/component A ratio of 66000. The activities obtained are three times greater than those obtained with a ratio of 6600. The reaction medium still sets, but the reduction in the quantity of catalyst precursor (component A) generates a less exothermal reaction. The molecular weights increase slightly with the increase in the monomer/component A ratio, as shown in appended FIG. 1 which illustrates the SEC profiles of the poly(1-hexene)s obtained with these two ratios of monomer/component A1. This result is most probably due to the slower setting of the reaction. With a monomer/component A1 ratio of 6600 the reaction is violent with immediate setting. The reduction in the quantity of component A1 allows stirring up until the end of the reaction.

Preferably, the monomer/component A molar ratio is greater than 50 000.

TABLE 2

| N° | [M]/[A1] | m (g) | Activity (g/mmol/h) | Mn (g/mol) | PI |
|---|---|---|---|---|---|
| 1 | 6 600[1] | 1.98 | 149 | 113 360 | 2.5 |
| 2 | 66 000[2] | 0.66 | 501 | 151 800 | 2.9 |

T = 27° C., t = 1 h,
[1]$V_{pentane}$ = 2 mL,
[2]$V_{pentane}$ = 0.2 mL.

Example 5

Influence of Component B/Component A Ratio

Table 3 shows the results obtained with 1, 2 and 4 equivalents of added magnesium agents.

TABLE 3

| N° | Equiv. of component B | m (g) | Activity (g/mmol/h) | Mn (g/mol) | PI |
|---|---|---|---|---|---|
| 1 | 1 | 0.67 | 501 | 151 800 | 2.9 |
| 2 | 2 | 1.29 | 766 | 153 750 | 2.9 |
| 3 | 4 | 0.08 | 49 | 166 600 | 3.0 |

T = 27° C., t = 1 h, [M]/[A1] = 66000; $V_{pentane}$ = 0.2 mL.

The molecular weights obtained are comparable, irrespective of the quantity of butylethylmagnesium used. The active species formed therefore appears to be the same in the three cases. Catalytic activity is optimal when two equivalents of magnesium are added. It is to be noted also that reactions with the ratio Mg/Ti=1 sometimes give rise to activities that are largely greater than test n°1 in table 3, namely: m=1.7 g; activity: 1280 g/mmol/h, Mn=142060 g/mol, PI=3.1 The addition of too large an excess of alkylating agent has an inhibiting effect on the catalytic reaction, probably due to the formation of a non-reactive species.

In general, the molar ratio of alkylating agent/component A lies between 0.1 and 10, preferably between 1 and 2.

Example 6

Influence of Alkylation Time and Solvent Effect

Two alkylation times: one hour and five minutes, and three solvents: pentane, bromobenzene and toluene were tested. The value of the magnesium agent/component A ratio was maintained at 1.

The results, given in table 4, show that no influence of alkylation reaction time was observed with bromobenzene, whereas with pentane there were important variations. The entirety of the active species is probably not fully formed in five minutes in pentane and its subsequent formation during the reaction may initiate new polymer chains thereby leading to an increase in the polymolecularity index (PI). With bromobenzene, the polarity of the solvent promotes the alkylation reaction and the formation and solubilisation of cationic species.

Bromobenzene shows the best results. Firstly it solubilises the different intermediates during the activation reaction, and secondly the activities and molecular weights obtained are greater than those obtained with pentane. Toluene shows comparable results to bromobenzene.

TABLE 4

| N° | Solvent | [M]/[A1] | M (g) | Activation time | Activity (g/mmol/h) | Mn (g/mol) | PI |
|---|---|---|---|---|---|---|---|
| 1 | pentane | 6 600 | 1.9 | 1 h | 149 | 113 360 | 2.5 |
| 2 |  | 6 600 | 3.3 | 5 min | 251 | 18 030 | 8.7 |
| 3 | bromo-benzene | 66 000 | 2.1 | 1 h | 1578 | 232 400 | 2.7 |
| 4 |  | 66 000 | 2.2 | 5 min | 1646 | 239 850 | 2.7 |
| 5 | toluene | 66 000 | 2.0 | 5 min | 1475 | 234 560 | 2.7 |

T = 27° C., t = 1 h, $V_{solvent}$ = 0.2 mL.

Example 7

Optimization of the Parameters of the Polymerization Method

The catalytic activities given for a monomer/component A ratio of 66000 in bromobenzene are reduced. The fast setting of the medium effectively does not allow the maximum activity of the catalytic system to be obtained. The quantity of component A in this case is in the order of 1 μmol. Polymerizations with higher monomer/catalyst ratios was performed. The catalytic results are given in table 5.

Each test was conducted with the same quantity of solvent and monomer (respectively 0.2 mL of solvent and 10 ml of monomer). The quantity of component A is obtained by dilution of a mother solution in bromobenzene, adjusted so as to use 0.2 mL of catalytic solution.

Up to a monomer/component A ratio of 132 000, the system sets progressively. Over and above this ratio no activity was observed. The quantity of component A1 used is in the order of 0.1 µmol. At this value, the system becomes highly sensitive to impurities.

So as to work with high monomer/component A ratios, TMA and TEA (10 equivalents) were added separately to the monomer as passivating agent, a few minutes before the addition of component A. No activity was observed with a monomer/component A ratio of 66000.

The maximum activity observed for this system, activated in situ by BEM and $B(C_6F_5)_3$ is 5 kg/mmol/h with molar weights of 239 000 g/mol.

TABLE 5

| N° | [M]/[A1] | µmol catalyst | M (g) | Activity (g/mmol/h) | Mn (g/mol) | PI |
|----|----------|---------------|-------|---------------------|-----------|----|
| 1  | 66 000   | 1.3           | 2.2   | 1646                | 239 850   | 2.7 |
| 2  | 132 000  | 0.65          | 3.4   | 5118                | 239 650   | 2.5 |
| 3  | 264 000  | 0.33          | —     | —                   | —         | —  |

T = 27° C., 1 eq. BEM, 1 eq. borane, 10 mL 1-hexene, t = 1 h, $V_{bromobenzene}$ = 0.2 mL.

Example 8

Test in the Pure Monomer

In a glove box in an argon atmosphere ($H_2O$ and $O_2$ content less than 1 ppm), 11.2 mg of component A1 (21.9 µmol) (R being the isopropyl group) are suspended in 8 mL dry, degassed 1-hexene. Under magnetic stirring, 16.3 mg of a 20 wt. % solution of butylethylmagnesium (29.3 µmol) in 1 mL 1-hexene are then added. After a reaction time of 2 minutes at room temperature, a solution of 11.7 mg of $B(C_6F_5)_3$ (22.0 µmol) is then added in 1 mL 1-hexene. The quantity of 1-hexene is 0.080 mol (3600 equivalents). After a reaction time of 25 minutes at room temperature, 20 mL of methanol are added to the reactor. A viscous white solid is precipitated. This is redissolved in dichloromethane then reprecipitated in methanol. 4.04 g of poly(1-hexene) are obtained i.e. a yield of 440 $kg_{pol}.mol_{cata}^{-1}.h^{-1}$. $^1H$ and $^{13}C$ analyses are characteristic of a regio-regular, atactic poly(1-hexene).

Example 9

1-Hexene-Ethylene Copolymerization Test

In a glass reactor and to a suspension of 10.2 mg of A1 (19.9 µmol) in 2.5 mL pentane, is added a solution of 11.4 mg of BEM (20.6 µmol) in 4 mL pentane. The reaction medium is placed under ethylene at 1 bar by successive purges of low vacuum and ethylene. The reactor is cooled to 0° C., and the successive addition is made of 10.6 mg BARF (20.7 µmol) in 5 mL pentane, then 1 mL 1-hexene (8 mmol, 400 equivalents). After 1 hour, 25 mL methanol are injected and evaporated to dryness to obtain a viscous white solid. Extraction is made with THF and the insoluble fraction (0.24 g of white solid) is separated by filtering. The insoluble fraction has a PI of 1.95 and a molar weight of 143 000 g/mol; the incorporation rate of ethylene is 28 molar % (on the basis of signals corresponding to the hexenyl and ethylenyl patterns under NMR of the proton).

Figure 2:
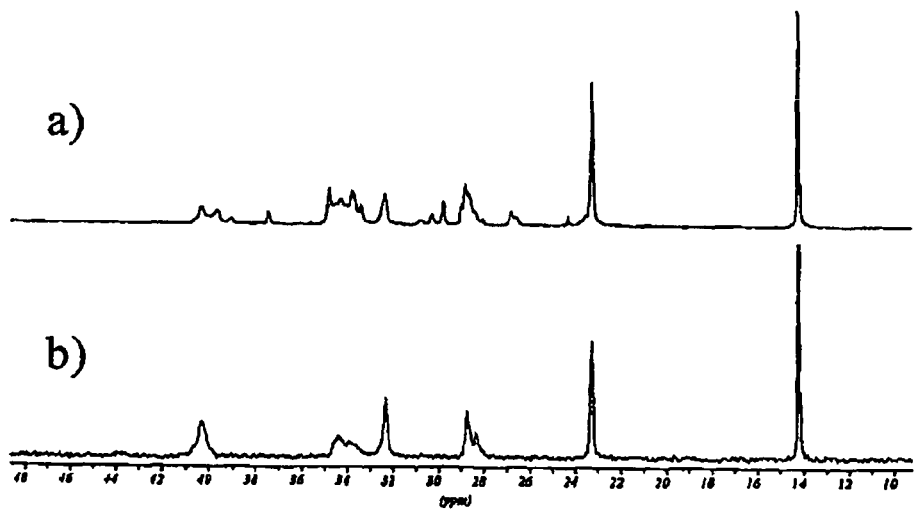
FIG. 2 shows the results of analysis by $^{13}$C NMR in CDCl$_3$, which confirms the formation of hexene-ethylene copolymer, with FIG. 2a being the spectrum of the copolymer and FIG. 2b being the spectrum of a typical polyhexene obtained with the catalytic combination of the invention (see Example 9 below).
Figure 3:
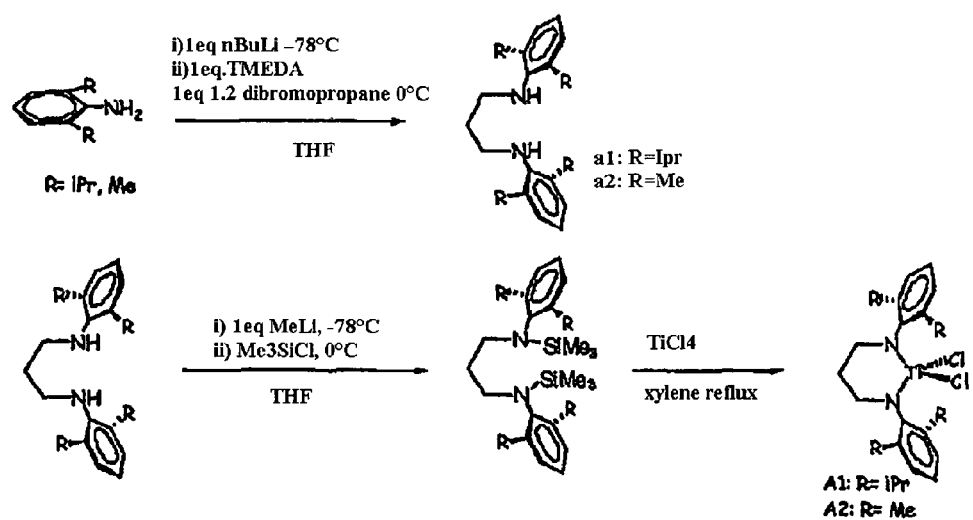
FIG. 3 shows the method to synthesize dichlorinated diamide complexes of titanium A1 and A2 described in the literature.
Figure 4:
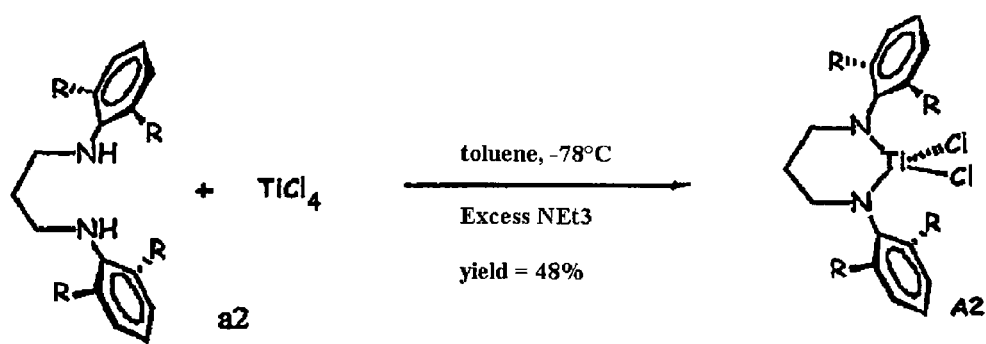
FIG. 4 shows a direct synthesis method from a diamine ligand of the present invention.

The soluble fraction in THF (0.45 g) is analyzed by $^{13}C$ NMR in $CDCl_3$, which confirms the formation of hexene-ethylene copolymer [as shown in appended FIG. 2, a) being the spectrum of the copolymer and b) being the spectrum of a typical polyhexene obtained with the catalytic combination of the invention]. The soluble fraction has a PI of 2.15 and a molar weight of 75 600 g/mol. The incorporation rate is estimated at 17 molar % (on the basis of signals corresponding to the hexenyl and ethylenyl patterns under NMR of the proton). It is therefore possible to obtain copolymers having variable characteristics and properties by mere precipitation of the mixture of copolymers obtained.

The catalytic combination A/B/C of the invention has numerous advantages. The dichorinated complex containing titanium diamide is distinctive in its simple synthesis using low-cost products, compared with zirconocenes. This system does not require the use of methylaluminoxane as co-catalyst, a costly product which through subsequent hydrolysis also causes the formation of aluminum hydroxide, an undesirable secondary product. This precursor system is of particular interest since it allows activities to be improved, and polymers or copolymers to be obtained having high molecular weights.

The invention claimed is:
1. A catalytic combination allowing the in situ generation of an active catalyst for the polymerization or copolymerization of alpha-olefins in the absence of any organic aluminum-containing compound, containing the following components A, B and C:
   component A which is a dichlorinated complex of titanium diamide having general formula I:

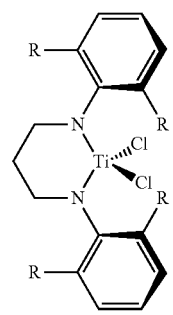

in which R is a methyl group or an isopropyl group;
component B which is a dialkylmagnesium whose reaction with component A in the absence of any organic aluminum-containing compound allows an alkylated component AA to be obtained of general formula II:

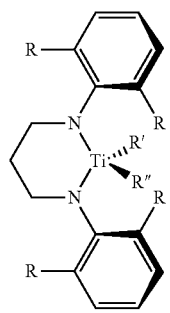

in which R is a methyl group or an isopropyl group, and in which R' and R" are substituents;
and, as activator of said alkylated component AA, component C which is tris-pentafluorophenylborane [$B(C_6F_5)_3$].

2. The catalytic combination according to claim 1, wherein component B is butylethylmagnesium.

3. A method to polymerize or copolymerize alpha-olefins, using the catalytic combination according to claim 1, wherein the method comprises the following steps:
  i) in situ alkylation of component A, previously suspended in a solvent, using component B which is a dialkylmagnesium whose reaction with component A in the absence of any organic aluminum-containing compound allows an alkylated component AA to be obtained of general formula II:

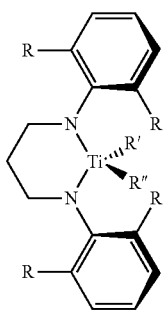

II in which R is a methyl group or an isopropyl group, and in which R' and R" are substituents;
  ii) activation of the alkylated compound AA through the addition of component C to the reaction medium, to form an active catalyst D in situ;
  iii) adding to the reaction medium containing the active catalyst D, at least one alpha-olefin monomer and optionally at least one comonomer under conditions enabling the synthesis of a polyalpha-olefin polymer or copolymer.

4. The method according to claim 3, wherein the alpha-olefin monomer is chosen from among the alpha-olefins in the range $C_2$ to $C_{30}$.

5. The method according to claim 4, wherein the alpha-olefin monomer is 1-hexene.

6. The method according to claim 3, wherein the comonomer is chosen from the range of $C_2$ to $C_{30}$ olefins.

7. The method according to claim 3, wherein the solvent in which component A is suspended is the (co)-polymerization alpha-olefin monomer.

8. The method according to claim 3, wherein the monomer/component A molar ratio is greater than 50,000.

9. The method according to claim 3, wherein the said component B/component A molar ratio lies between 0.1 and 10.

10. The method according to claim 3, wherein the alkylation step is conducted in an alkylation solvent, and the activation step is conducted in an activation solvent, said alkylation solvent and said activation solvent are selected from the group consisting of: pentane, toluene, bromobenzene, and pure-alpha-olefin monomer.

11. The method according to claim 3 which, prior to step 1, comprises a step to prepare component A according to the following reaction:

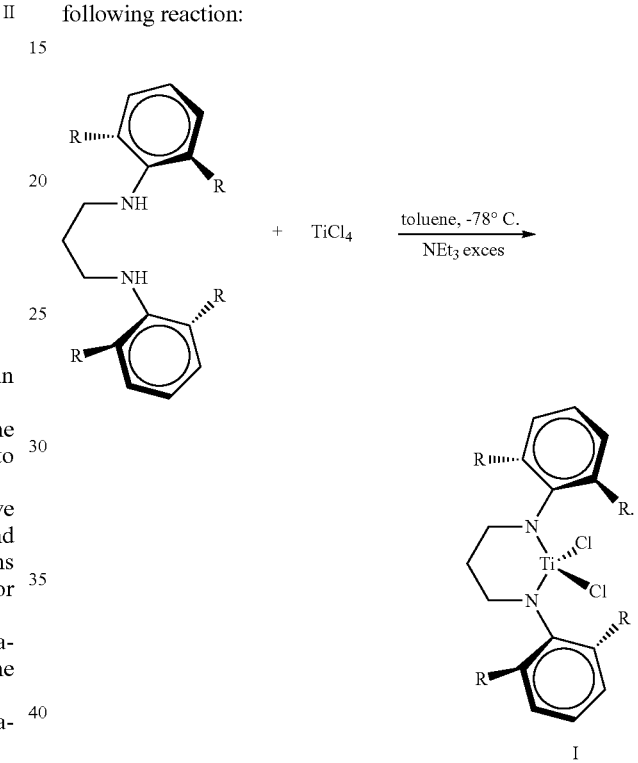

12. The method according to claim 9, wherein the said component B/component A molar ratio lies between 1 and 2.